US005663507A

United States Patent [19]
Westervelt et al.

[11] Patent Number: 5,663,507
[45] Date of Patent: Sep. 2, 1997

[54] SEMICONDUCTOR PIEZOELECTRIC STRAIN MEASURING TRANSDUCER

[75] Inventors: Robert M. Westervelt, Lexington; Rex G. Beck, Cambridge, both of Mass.

[73] Assignee: President and Fellows at Harvard College, Cambridge, Mass.

[21] Appl. No.: 616,886

[22] Filed: Mar. 18, 1996

[51] Int. Cl.[6] .................................................. G01L 9/06
[52] U.S. Cl. ........................................... 73/727; 73/777
[58] Field of Search ............................ 73/726, 727, 763, 73/777

[56] References Cited

U.S. PATENT DOCUMENTS

| | | | |
|---|---|---|---|
| 4,480,488 | 11/1984 | Read et al. | 73/862.68 |
| 4,522,072 | 6/1985 | Sulouff et al. | 73/765 |
| 4,606,231 | 8/1986 | Beling | 73/862.63 |
| 5,116,051 | 5/1992 | Moncrief et al. | 273/148 B |
| 5,253,532 | 10/1993 | Kamens | 73/708 |
| 5,279,162 | 1/1994 | Takebe et al. | 73/726 |

OTHER PUBLICATIONS

AlGaAs/GaAs Micromachining for Monolithic Integration of Micromechanical Structures with Laser Diodes, Y. Uenishi, H. Tanaka and H. Ukita, IEICE Trans. Electron, E78–C, No. 2, 139–145 (1995).

Submicron, Movable Gallium Arsenide Mechanical Structures And Actuators, Z. Lisa Zhang, G.A. Porkolab and N.C. MacDonald IEEE MEMS, 72–77 (1992).

Bulk And Surface Micromachining Of GaAs Structures, Klas hjort, Jan–Ake Schweitz and Bertil Hok, IEEE MEMS, 73–76 (1990).

Microlever with combined integrated sensor/actuator functions for scanning force microscopy, J. Brugger, N. Blanc, Ph. Renaud and N.F. de Rooij, Sensors and Actuators A,43,339–345 (1994).

Atomic resolution with an atomic force microscope using piezoresistive detection, M. Tortonese, R.C. Barrett and C.F. Quate, Appl. Phys. Lett 62, 834 (1993).

Scanning Force Microscope Using a Peizoelectric Microcantilever, T. Itoh and T. Suga, J. Vac Sci. Technol. B 12 1581 (1994).

Force measurement with a piezoelectric cantilever in a scanning force microscope, J. Tansock and C.C. Williams, Ultramicroscopy 42–44, 1464 (1992).

Scanning Force Microscope Using Piezoelectric Excitation and Detection, T. Itoh, T. Ohashi and T Suga, IEICE Trans. Electron, E78–C, No. 2, 146–151 (1995).

Piezoelectric Effects in GaAs FET's and Their Role in Orientation–Dependent Device Characteristics, P.M. Asbeck, C.P. Lee, and M.F. Chang, IEEE Trans. Electron Devices, ED–31, 1377–1380 (1984).

Role of the piezoelectric effect in device uniformity of GaAs integrated circuits, M.F. Chang, C.P. Lee, P.M. Asbeck, R.P. Vahrenkamp and C.G. Kirkpatrick, Appl. Phys. Lett., 45 (3), 279–281, (1984).

Improvement in GaAs MESFET Performance Due to Peizoelectric Effect, T. Onodera, T Ohnishi, N. Yokoyama and H. Nishi, IEEE Trans. Electron Devices, ED–32 2314–2318 (1985).

(List continued on next page.)

Primary Examiner—George M. Dombroske
Assistant Examiner—Max H. Noori

[57] ABSTRACT

A novel GaAs/AlGaAs piezoelectric FET strain sensing transducer is disclosed. An embodiment of the strain sensing transducer includes a single piezoelectric crystal structure forming a cantilever arm and having an FET at the fixed cantilever base. Circuitry connected to measure changes in the conductivity of the FET Channel provides an output signal indicative of the measured strain produced by small forces which alter the conductance of the FET due to piezoelectric effects.

14 Claims, 3 Drawing Sheets

OTHER PUBLICATIONS

Cryogenic field-effect transistor with single electronic charge sensitivity, D.J. Mar, R.M. Westervelt and P.F. Hopkins, Appl. Phys. Lett. 64, 631 (1994).

Small-Signal Equivalent Circuit Of The FET, D.L. Schilling and C. Belove, Electronic Circuits, discrete and integrated, (New York, McGraw-Hill, Inc., 1979).

Introduction to Scanning Tunneling Microscopy, C. Julian Chen, (New York: Oxford University Press, 1993).

Piezoelectric properties of GaAs for application in stress transducers, K. Fricke, J. Appl. Phys. 70, 914 (1991).

Electrons and phonons, J.M. Ziman, (Oxford, Oxford University Press, 1960).

Gallium Arsenide, J.S. Blakemore, (New York, American Institute of Physics, 1897).

Physical Properties of Crystals, J. F. Nye, (Clarendon, Oxford University Press, 1957).

AUTHOR: Yoshida T.; Kudo, T.; Kato, S.; Miyazaki, S.; Kiyono, S.; Ikeda, K. TITLE: Strain sensitive resonant gate transistor SOURCE: Proceedings, IEEE Micro Electro Mechanical Systems 1995 (Cat. No. 95CH35754), pp. 418, 316–321 YEAR: 1995.

AUTHOR: Chen, P.L.; Muller, R.S.; Andrews, A.P. TITLE: Integrated silicon PI-FET accelerometer with proof mass SOURCE: Sensors and Actuators, vol. 5, No. 2 pp. 119–126 YEAR: Feb. 1984.

AUTHOR: Canali, C.; Ferla, F.; Morten, B.; Taroni, A. TITLE: Piezoresistivity effects in MOS-FET useful for pressure transducers SOURCE: Journal of Physics D(Applied Physics), vol. 12, No. 11, YEAR: 14 Nov. 1979.

AUTHOR: Conragan, J. TITLE: Piezoelectric field-effect transistor strain transducers.

SEMICONDUCTOR PIEZOELECTRIC STRAIN MEASURING TRANSDUCER

This invention was supported by ONR Grant No. N00014-95-1-0866 and the government has certain rights to the invention.

BACKGROUND OF THE INVENTION

1. Field of the Invention

Embodiments of the present invention relate generally to elements which sense or measure strain associated with the deflection of a substrate on the order of microns. Such substrates may include a beam secured at two ends or a cantilever secured at one end. More particularly, embodiments of the present invention relate to a strain-sensing or strain-measuring structures formed from semiconductor materials which exhibit a piezoelectric effect when subject to stress.

2. Description of Related Art

Arrangements incorporating electromechanical transducers and strain sensors are known. See, for example, U.S. Pat. No. 4,522,072, hereby incorporated by reference in its entirety, which describes a cantilever beam accelerometer and several separate silicon-based strain sensing elements connected by wheatstone bridges. The sensing elements may be field effect transistors (FET) which are generally known to be voltage controlled devices in which the current conduction between a source region and a drain region through a channel region is controlled or modulated by means of a control voltage applied to a gate terminal.

Other silicon based strain sensors are also known which incorporate a piezoelectric material as an integral part of a non-piezoelectric FET. The principle of operation results from a direct interaction between the piezoelectric material and the channel region of the FET. These types of strain sensors are fashioned from at least two different materials: a first material for the FET and a second material for the piezoelectric region incorporated into the FET.

Micromachined gallium-arsenide (GaAs) systems have been used to produce micromechanical structures. See, for example, AlGaAs/GaAs Micromachining for Monolithic Integration of Micromechanical Structures with Laser Diodes, by Y. Uenishi, H. Tanaka and H. Ukita, *IEICE Trans. Electron.*, E78-C, No. 2, 139–145 (1995); Submicron, Movable Gallium Arsenide Mechanical Structures and Actuators, by Z. Lisa Zhang, G. A. Porkolab and N. C. MacDonald *IEEE MEMS*, 72–77 (1992); and Bulk and Surface Micromachining of GaAs Structures, by Klas Hjort, Jan-Åke Schweitz and Bertil Huk., *IEEE MEMS*, 73–76 (1990), also hereby incorporated by reference. GaAs semiconductor materials exhibit piezoelectric properties, and these properties are known to affect FET parameters. See, Piezoelectric Effects in GaAs FET's and Their Role in Orientation-Dependent Device Characteristics, by P. M. Asbeck, C. P. Lee, and M. F. Chang, *IEEE Trans. Electron Devices*, ED-31, 1377–1380, (1984); Role of the piezoelectric effect in device uniformity of GaAs integrated circuits, by M. F. Chang, C. P. Lee, P. M. Asbeck, R. P. Vahrenkamp and C. G. Kirkpatrick, *Appl. Phys. Lett.*, 45 (3), 279–281, (1984); and Improvement in GaAs MESFET Performance due to Piezoelectric Effect by T. Onodera, T. Ohnishi, N. Yokoyama and N. Nishi, *IEEE Trans. Electron Devices*, ED-32, 2314–2318, (1985) hereby incorporated by reference in their entirety. However, no strain measurement devices based on a GaAs FET are known to exist.

When the size scale of systems used to detect mechanical deflections becomes small, i.e. on the order of microns, the detection of the mechanical deflection of a substrate, such as a cantilever or a beam, presents a challenge for known displacement-type sensors which generally operate separately from the substrate being deflected to detect and measure the degree of physical displacement of the substrate. Currently most systems to measure deflection of a substrate rely on optical readouts of deflection which presents disadvantages if the sample being scanned is photo-sensitive. Alternative deflection sensing mechanisms have been developed including external readouts via capacitance, see Microlever with combined integrated sensor/actuator functions for scanning force microscopy, by J. Brugger, N. Blanc, Ph. Renaud and N. F. de Rooij, *Sensors and Actuators A*, 43, 339–345 (1994) and integrated internal readouts via piezoresistive cantilevers, (see Atomic resolution with an atomic force microscope using piezoelectric deflection, by M. Tortonese, R. C. Barrett and C. F. Quate, *Appl. Phys. Lett.* 62, 834 (1993)), and piezoelectric bimorph cantilevers, (see, Scanning force microscope using a piezoelectric microcantilever, by T. Itoh and T. Suga, *J. Vac. Sci. Technol. B* 12, 1581 (1994); Force measurement with a piezoelectric cantilever in a scanning force microscope, by J. Tansock and C. C. Williams, *Ultramicroscopy* 42–44, 1464 (1992); and Scanning Force Microscope Using Piezoelectric Excitation and Deflection, by T. Itoh, T. Ohashi and T. Suga, *IEICE Trans. Electron*, E78-C, No. 2, 146–151 (1995) which are used to detect surface forces between a nanometer scale tip and a sample surface based upon a measured piezoelectric effect resulting from the movement of the cantilever.

The strain produced by a force or by a displacement generally increases as the size of the mechanical structure is reduced. Thus, a strain sensor presents a desirable alternative to deflection sensors for detecting small forces and displacements in micro-mechanical systems. Scanned probe microscope (SPM) cantilevers provide one important example of a small system where a strain sensor could be used. Additionally, the strain produced as a result of movement of a microcantilever is greatest at the fixed base portion of the cantilever. Measurement of the strain at that portion of the cantilever, therefore, should be optimized to provide increased sensitivity and accuracy. Consequently, a strain-sensing cantilever structure is needed which overcomes the disadvantages of the prior art deflection sensors and which provides a sensing or measuring mechanism which overcomes the disadvantages and improves on the shortcomings of the simple bimorph piezoelectric cantilevers.

SUMMARY OF THE INVENTION

Embodiments of the present invention relate generally to a strain measuring transducer having a single piezoelectric crystal lattice structure, such as that in a GaAs/AlGaAs heterostructure, which can serve as an integrated strain-sensor in micro-mechanical systems. The strain measuring transducer has an FET, including a semiconducting channel and a gate, which is etched into the base of a beam or cantilever arm. The base is fixed by a substrate and is the location of maximum strain of the beam or cantilever arm. A displacement section of the beam or cantilever arm extends outwardly from the base section. Circuitry is provided to apply an electrical potential to opposing ends of the channel to cause an electrical current to flow through the channel. The cantilever is designed such that a variable physical force can be applied to the transducer so as to subject the base of the beam or cantilever arm and, accordingly, the FET region to a variable strain which creates a piezoelectric effect. A sensor is connected to the FET region to measure changes in the electrical conductivity of the FET caused by the piezoelectric effect generated by the variable strain. Circuitry is also provided to measure the changes in the electrical conductivity due to changes to the displacement of, or the physical force applied to, the transducer, thereby providing a readout. The piezoelectric effect therefore couples stress in the channel region of the cantilever to electron density in the channel region giving an electrical response to applied strain at the region of maximum strain along the cantilever which can be measured and related to the force or displacement creating the strain.

Strain measuring transducers of the present invention are low noise and are capable of detecting volume or dilitational strains $\epsilon$ on the order of $2 \times 10^{-9}/\sqrt{Hz}$ or less. Strain measuring transducers of the present invention have a charge noise $q_n$ on the order of $0.2$ e$/\sqrt{Hz}$ or less where e is the charge of a single electron and a 1/f noise corner less than 300 Hz.

Embodiments of the present invention are advantageous in that they provide strain measuring transducers which can be fabricated entirely from a single piezoelectric material, such as is contained in a GaAs/AlGaAs heterostructure, with dimensions on the micron and submicron levels. Strain sensors of the present invention are further advantageous in that they can be used to produce a micro-electromechanical system out of the heterostructure itself thus integrating the FET directly into the mechanical structure of the measurement system. This novel advancement over the prior allows the strain measuring transducers of the present invention to achieve levels of sensitivity beyond those taught in the art enabling greater application of the sensors to micron and submicron systems. Strain measuring transducers according to the present invention operate over a large bandwidth, i.e. on the order of 100 kHz and above and can be integrated directly into micro-mechanical systems. Strain measuring transducers of the present invention have a low power dissipation, i.e. on the order of 5 µW and less which makes them suitable for operation at dilution refrigerator temperatures.

Embodiments of the present invention have advantageous applications wherever ultrasmall forces or displacements are required to be sensed or measured. Various applications include scanning force microscopes, atomic force microscopes (AFMs), accelerometers, and the like. Additional applications include those in aqueous environments since the strain sensing transducers are envisioned to be insulated from the effects of environmental conditions.

Accordingly, it is an object of the present invention to provide a strain measuring transducer having its greatest sensitivity at the region of maximum strain along a cantilever. It is an additional object of the present invention to provide a strain measuring transducer fabricated from a single piezoelectric crystal lattice structure. It is a further object of the present invention to provide a strain measuring transducer useful to measure small forces and small displacements in micromechanical systems. It is a still further object of the present invention to improve the sensitivity and accuracy of piezoelectric based transducers.

Other objects, features or advantages of the present invention will become apparent from the following description taken in conjunction with the accompanying drawings.

BRIEF DESCRIPTION OF THE DRAWINGS

In the course of the detailed description of certain preferred embodiments to follow, reference will be made to the attached drawings, in which.

DETAILED DESCRIPTION OF PREFERRED EMBODIMENTS

The principles of the present invention may be applied with particular advantage to provide a strain measuring transducer fabricated from a single piezoelectric crystal lattice structure, such as that in a GaAs/AlGaAs heterostructure, containing a near surface two-dimensional electron gas (2DEG). It is to be understood that other useful piezoelectric materials can be identified by those skilled in the art based upon the teachings presented herein. The GaAs/AlGaAs heterostructure of the present invention may be fabricated according to teachings well known in the art for creating semiconductor wafer materials, such as vapor deposition, including the teachings found in Cryogenic field-effect transistor with single electronic charge sensitivity, by D. J. Mar, R. M. Westervelt and P. F. Hopkins, Appl. Phys. Lett. 64, 631 (1994), hereby incorporated by reference in its entirety.

Figure 1:
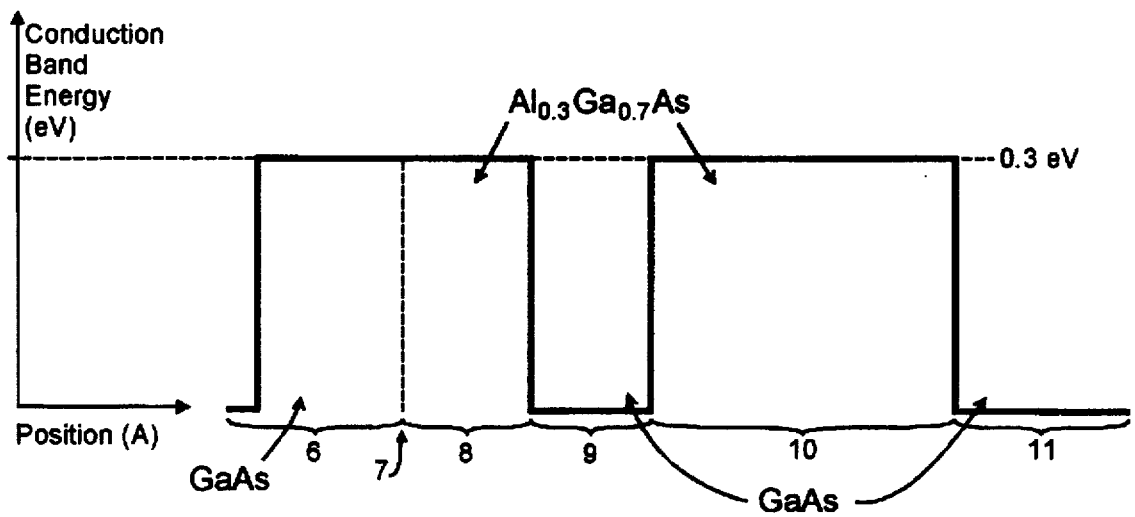
FIG. 1 is a conduction band energy diagram showing conduction band energies and layer thicknesses for the various layers in a GaAs/AlGaAs heterostructure of the type utilized by the invention.

FIG. 1 is a conduction band energy diagram showing the layered configuration of the GaAs/AlGaAs heterostmcture of the present invention. As shown in FIG. 1, the surface layer of the heterostmcture seen at 6 consists of approximately 50 Å (angstroms) of GaAs followed by an additional 250 Å of GaAs material. A silicon delta doping layer having a concentration of approximately $8 \times 10^{12}/cm^2$ is placed at 7 between the 250 Å layer 6 of GaAs and a 220 Å layer of $Al_{0.3}Ga_{0.7}$ as seen at 8. The next layer 9 of the heterostmcmre is a 200 Å layer of GaAs followed by a 5250 Å layer 10 of $Al_{0.3}Ga_{0.7}As$ which, in turn, is followed by a 2000 Å GaAs substrate layer 11. A square well to confine the electron gas is etched into the 200 Å GaAs layer 9 which is sandwiched between the two $Al_{0.3}Ga_{0.7}As$ layers 8 and 10.

It is to be understood that other useful semiconductor structures which will support an FET and which are piezoelectric can be identified by those skilled in the art based upon the teachings of the present invention. For example, modulation doped heterostructures using only GaAs/AlGaAs or others which add Indium in the well region which are used to fabricate pseudomorphic high electron mobility transistors (HEMTS) are useful in the present invention.

Figure 2:
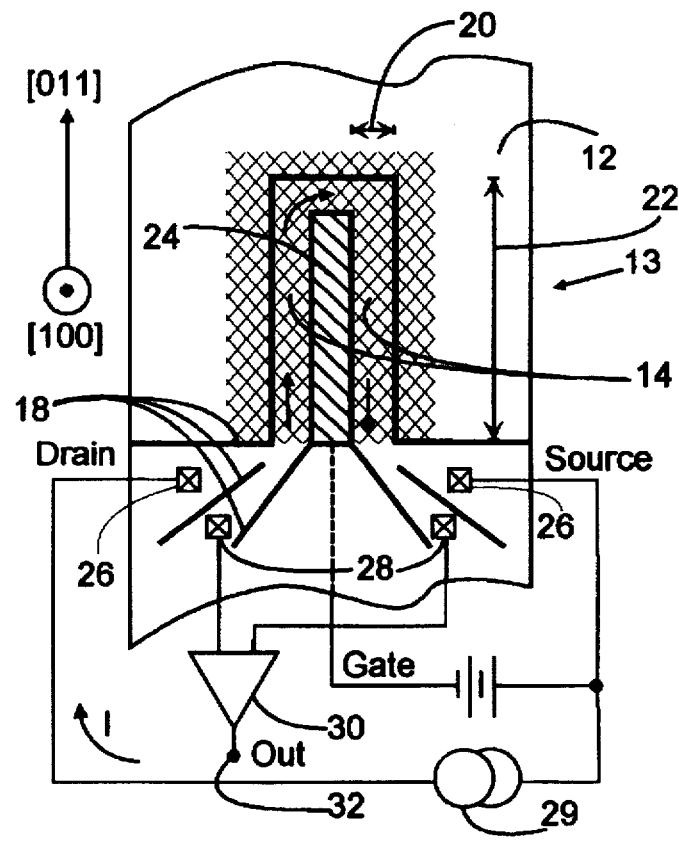
FIG. 2 is a etching layout diagram of a strain measuring transducer fabricated in accordance with the principles of the present invention.

FIG. 2 illustrates the configuration of the etched lines which form the FET strain measuring transducer in accordance with the principles of the present invention. As can be seen in FIG. 2, the strain measuring transducer includes etched lines 18 on one surface of the crystal lattice heterostructure 12 for form a field effect transistor (FET) region indicated generally at 13. The heterostructure 12, herein referred to as a "cantilever," is etched on the [100] crystal face of the GaAs/AlGaAs crystal lattice to form a channel 14. The etch trenches 18 may be added in a conventional manner using electron beam lithography and a mesa etch, forming the channel 14 having a width 20 on the order of 5 μm and an overall length on the order of 100 μm, with each U-arm length 22 and 22 being on the order of 50 μm. The arrows indicate the current path through channel 14. Channel 14 positioned on the face of the cantilever 12 with its longer dimension parallel to the strain forces applied to the surface when the cantilever is deflected, as discussed below. It is to be understood that other useful channel configurations and dimensions can be determined by those skilled in the art based upon the teachings advanced herein. It is also to be understood that the FET 13 is to be etched on the crystal face of the particular piezoelectric material being used to fabricate the transducer such that a variable strain on the transducer results in a piezoelectric effect. In the particular embodiment of FIG. 1, stress is applied in the [011] direction along the length of the channel.

Channel 14 is configured to contain a near surface two dimensional electron gas (2DEG) with sheet density $n_s=2\times 10^{11}/cm^2$ and mobility $\mu=1.5\times 10^5$ cm$^2$/V-sec. The 2DEG is confined by a 200 Å square well beginning 520 Å beneath the surface of the heterostructure. Gate region 24 shown by the crosshatching in FIG. 2 may be made by thermally evaporating 200 Å of chrome followed by 2500 Å of gold over channel 14 giving a total gate area of 500 μm$^2$ and a nominal gate to channel capacitance of 1.0 pF. Ohmic contacts 26 are positioned between etch lines as shown and provide electrical contact to the 2DEG. Ohmic contacts 26 may be made by thermally diffusing AuNiGe contacts into cantilever to provide drain and source electrical connections as indicated.

Channel 14 is current biased by a current source 29 which may consist of a low-noise voltage source in series with a 1 MΩ resistor. Drain-source voltage is monitored with a PAR 113 preamplifier 30 which has a noise temperature of less than 6.5K. for typical resistances (1MΩ) and frequencies (10 Hz to 10 kHz). Ohmic contacts 28 connected to the inputs of the amplifier 30 are positioned between etch lines 18 to measure the change in channel conductance resulting from the piezoelectric effect upon stress of the FET. The output potential at output terminal 30 is supplied to circuitry (not shown) for displaying or otherwise utilizing the magnitude of this output potential as an indication of the magnitude of stain applied to the crystal lattice face at the channel 14.

Figure 3:
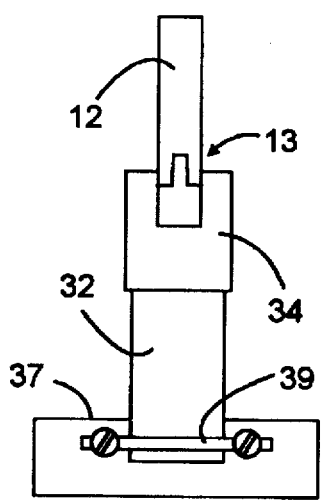
FIG. 3 illustrates a mounting structure for mounting and testing a strain measuring transducer of the present invention.

FIG. 3 is a schematic showing the apparatus which is used to secure a strain measuring transducer to which strain is applied. The strain measuring transducer shown generally as cantilever 12 has the FET channel and gate configuration also seen in FIG. 2 shown generally at 13. Cantilever 12 is shown as being mounted on a piezoelectric bimorph 32 which is driven through the resonant frequency of the cantilever 12. An aluminum substrate reinforced with a small Macor block seen at 34 serve as both a rigid extension to prevent the deformation of the bimorph 32 from straining the cantilever 12 and as a ground plane to isolate the cantilever 12 from the relatively exitation large voltages applied to the bimorph 32. Cantilever 12 is mounted to create the region of maximum bending and maximum strain of the cantilever at the FET region 13 by positioning the region 13 near the outside edge of the bimorph 34.

In order to more accurately measure the characteristics of the FET transducer formed by the heterostructure cantilever 12, the cantilever/bimorph assembly seen in FIG. 3 was mounted in vacuum inside a thermal shield attached to the cold plate of an Infrared Labs liquid Helium Dewar (not shown), with an opening in the shield to allow optical access to the entire cantilever. The sample temperature was ≈10K. due to heating from black body radiation through the optical access window located 7 cm away. Although experiments were conducted at temperatures around 10K., those skilled in the art will recognize that the strain sensing transducers of the present invention may also operate at other temperatures, including room temperatures with minor modifications.

Figure 4:
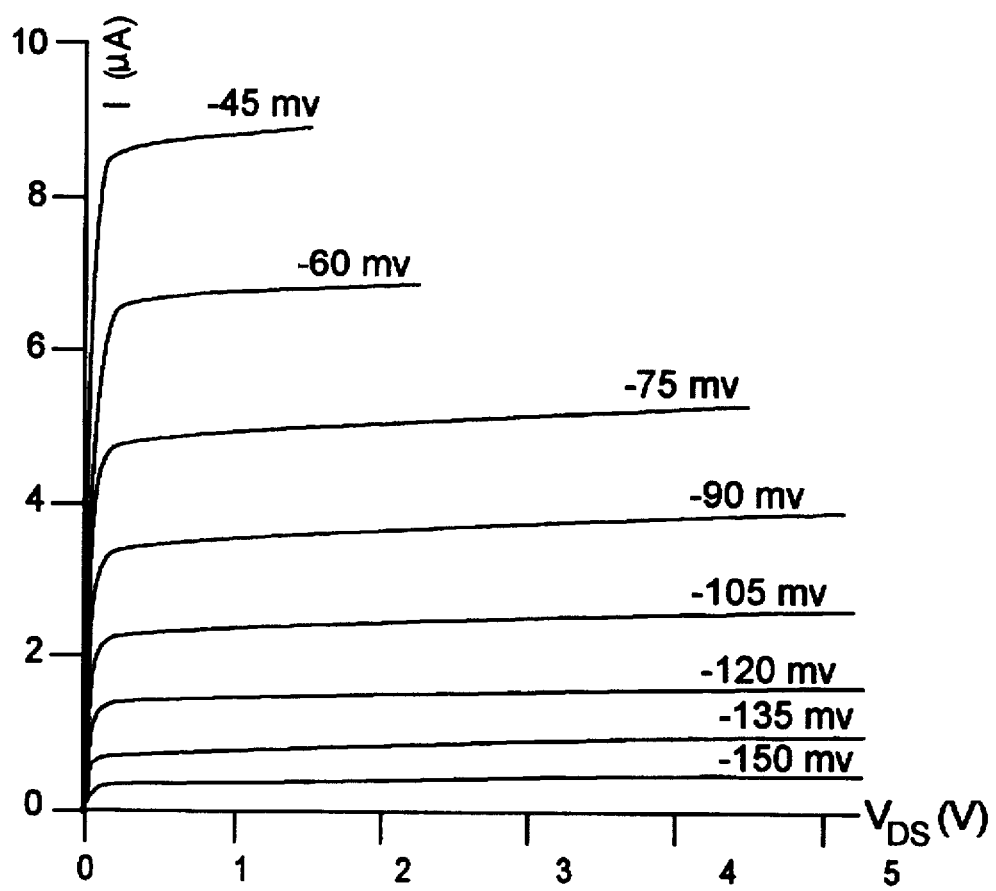
FIG. 4 is a graph depicting the measured drain characteristics for the strain measuring transducer at T$\simeq$10K.

FIG. 4 shows the measured drain characteristics for the strain measuring transducer at T=10K. The strain measuring transducer operated with low noise in the saturation region and displayed a typical transconductance $g_m=100$ μS and a small-signal drain-source resistance $r_{ds}$ approximately equal to 10MΩ. No carrier heating effects were observed even when the depletion region was largest ($V_{GS}=-150$ mV and $V_{DS}=6$ V) indicating that the electrons are strongly confined by the square well structure of the FET.

Figure 5:
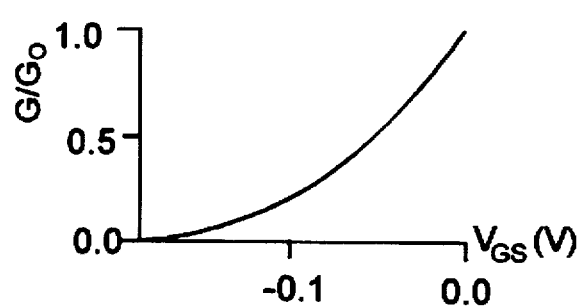
FIG. 5 is a graph depicting channel conductance G versus gate Voltage $V_{GS}$.

FIG. 5 shows a plot of channel conductance G versus gate Voltage $V_{GS}$. The conductance changed by five orders &magnitude with $V_{GS}$ from its zero gate voltage value $G_0=2.5$ mS. The small magnitude of the threshold voltage ($V_T=-170$ mV) gives excellent sensitivity while the smooth, constant curvature indicates little parallel conduction.

Measured gain and frequency responses were in accord with simple field-effect transistor models. At a typical operating point ($V_{GS}=-85$ mV and $I_D=3.8$ μA) the dimensionless voltage gain $A_v=70$. Gain was found to vary with a square root dependence on drain current $A_v \propto I_D^{1/2}$ as expected. See, D. L. Schilling and C. Belove, Electronic Circuits, discrete and integrated, (New York, McGraw-Hill, Inc., 1979). A rolloff occurred above a 3 dB point of 400 Hz due to Dewar lead capacitance ≅400 pF. The ac output signal was constant up to 100 kHz for voltage biased measurements. A figure of merit for transistor speed is given by $C_G/g_m$ where $C_G$ is the capacitance between the gate and the 2DEG. This indicates an intrinsic rolloff frequency of 16 Mhz for the geometry shown in FIG. 2. Much higher operating frequencies can be obtained using a geometry with a shorter and wider channel.

Figure 6:
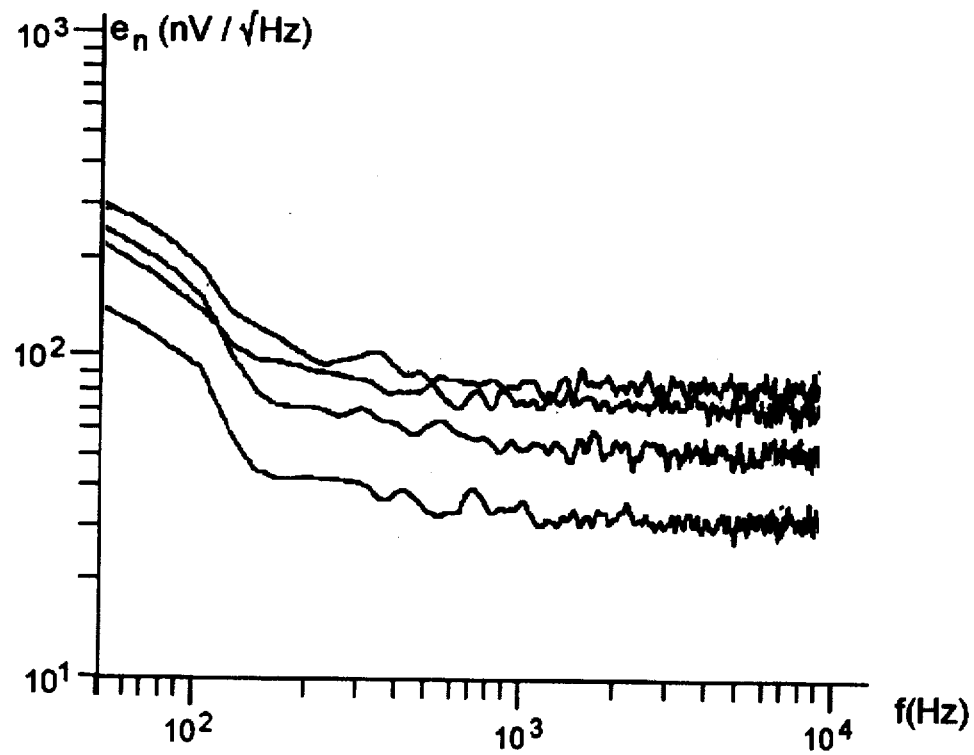
FIG. 6 is a graph of measured spectra for voltage noise $e_n$ referred to the input of the strain measuring transducer.

FIG. 6 shows measured spectra for voltage noise $e_n$ referred to the input of the field-effect transistor. The noise is characterized by a flat spectrum at high frequencies with a low 1/f noise corner above 300 Hz. The magnitude of the voltage noise is independent of drain-source voltage $V_{DS}$ for a given gate-source voltage $V_{GS}$ but increases with increasing channel current as $e_n^2 \propto I_D$. The noise contribution from the external circuit is dominated by a white noise level of 20 nV/√Hz from the voltage source used to apply a voltage to the gate; noise from the PAR 113 preamplifier is negligible. The lowest noise occurs for $V_{GS}=-150$ mV where the charge noise $q_n=e_nC_G<0.2$ e/√Hz.

Figure 7:
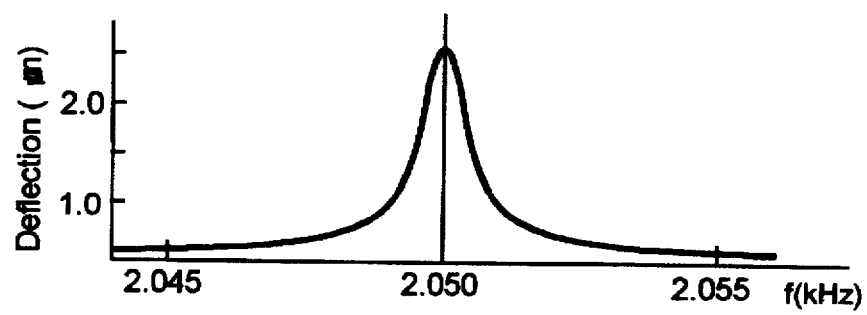
FIG. 7 is a graph depicting a measured small signal response $v_{DS}$ of the strain measuring transducer for operating point $V_{GS}$=85 mV and $I_D$=3.8 µA about the sharp (Q=2000) mechanical resonance of the strain measuring transducer.

The strain measuring transducer of the present invention was subjected to strain by applying a variable frequency voltage (0.25 $V_{pp}$) to the bimorph to drive the chip through its lowest mechanical resonance. FIG. 7 shows the measured small signal response $v_{DS}$ of the strain measuring transducer for operating point $V_{GS}=85$ mV and $I_D=3.8$ μA about the sharp (Q=2000) mechanical resonance of the strain measuring transducer. The strain at this resonance was measured using a Michelson interferometer operated through an optical access port in the Dewar. At T=10K the resonating cantilever was placed at one arm of the interferometer. The resulting flinges were detected by a photo diode mounted behind a pinhole and recorded by a digital storage scope. By sliding the Dewar to expose different parts of the vibrating cantilever, data on amplitude of vibration as a function of position were obtained. Multiple measurements at each position on the cantilever were made and then averaged.

Figure 8:
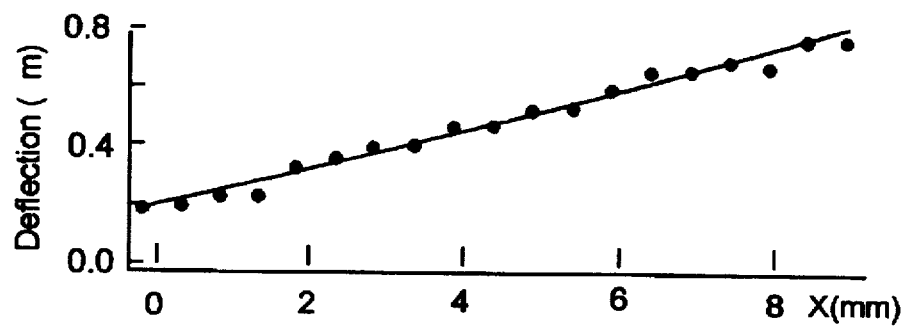
FIG. 8 is a graph of the amplitude of deflection along the entire length of the cantilever.

FIG. 8 shows the amplitude of deflection along the entire length of the cantilever; the arrow indicates the position of the channel region. The data was fit to the equation of a driven cantilever beam (see, C. Julian Chen, *Introduction to Scanning Tunneling Microscopy*, (New York, Oxford University Press, 1993) with boundary conditions of zero force and moment at the free end, fixed amplitude at the driven end and a slope at the driven end which was allowed to vary as a free parameter of the fit. The fit shown in FIG. 8 indicates a total volume strain $\epsilon$ in the channel region $\epsilon = 7 \times 10^{-7}$. For this channel region, the normalized strain responsivity $r = N/A\epsilon$ where N is the change in number of gate electrons and A is the gate area, has a value $r = 7.1 \times 10^{13}/cm^2$. Combining this value with the measured charge noise gives a strain sensitivity of $\epsilon_n = 2 \times 10^{-9}/\sqrt{Hz}$. For comparison, a GaAs/AlGaAs scanned probe microscope (SPM) cantilever of typical dimensions (100 µm×20 µm×1 µm) with an integrated FET would have a force sensitivity less than 20 pN/√Hz and a vertical resolution less than 0.5 Å/√Hz. The maximum uniaxial strain $\epsilon_{max}$ at the base of a cantilever with rectangular cross section is given by $\epsilon_{max} = 6Fl/(Et^2 w)$ (see, C. Julian Chen, *Introduction to Scanning Tunneling Microscopy*, (New York, Oxford University Press, 1993)) where F is the force applied to its end, l, w and t are the length, width and thickness respectively and E is Young's modulus. The minimum vertical resolution is given by $u_{min} = 2\epsilon_{nu} l^2/3t$ where $\epsilon_{nu}$ is the uniaxial strain sensitivity.

These expressions show that force sensitivity and vertical resolution of a strain sensing cantilever increases for small sizes. The strain sensing FETs according to the invention can accordingly be used to fabricate and sense the forces within cantilevers and electromechanical structures having sizes much smaller than those currently in use, going all the way into the submicron region. The fabrication and operation of strain sensing mechanisms using displacement sensors, such as the optical readout mechanism which currently dominate the commercial market, or piezolevers, which require relatively high power dissipation. Using the principles of the present invention, a 100 µm long cantilever as shown in FIG. 2 exhibits a sensitivity comparable to conventional cantilever. For smaller cantilevers approaching 1 micron in length, the force and displacement sensitivity can be orders of magnitude greater; accordingly, the present invention may be used to particular advantage in the construction of can strain sensing cantilevers or beams having a long dimension of 100 microns or less.

Two mechanisms which provide an electrical response to strain in GaAs are the piezoelectric effect (see, K. Fricke, *J. Appl. Phys.* 70.914 (1991)) and the deformation potential (see, J. M. Ziman, *Electrons and Phonons*. (Oxford, Oxford University Press, 1960)). Both couple strain to a change in the number of electrons in the channel. At the mechanical resonance peak, a change in amplitude of 250 gate electrons was measured. The shift in the conduction band energy due to the deformation potential is given by $\Delta E_c = a\epsilon$ (see, J. S. Blakemore, *Gallium Arsenide*, (New York, American Institute of Physics, 1987)) where $\Delta E_c$ is the conduction band shift, a=8 eV is the hydrostatic pressure deformation potential and $\epsilon$ is the volume strain. The shift in the number of gate electrons given by $\Delta N = C_G \Delta E_c / e^2$ where $C_G$ is the gate/channel capacitance and e is the electronic charge results in 35 gate electrons shifting to equalize the chemical potential. The piezoelectric effect produces a polarization given by $P_i = d_{ijk} s_{jk}$ (see, K. Fricke, *J. Appl. Phys.* 70.914 (1991) and J. F. Nye, *Physical Properties of Crystals*, (Clarendon, Oxford University Press, 1957) where $P_i$ is the induced polarization in the i direction, $d_{ijk}$ is the piezoelectric tensor and $s_{jk}$ the stress tensor. The stress given by the fit in FIG. 8 is applied in the [011] direction for the channel/gate orientation with respect to the GaAs crystal axes indicated in FIG. 2. The resulting nominal polarization is perpendicular to the plane of the 2DEG and induces a change in amplitude of 740 electrons on the gate. Thus, the piezoelectric effect dominates the strain induced signal. The measured charge in the strain measuring transducer of the present invention is less than the maximum predicted for the piezoelectric effect.

It is to be understood that the embodiments of the invention which have been described are merely illustrative of some applications of the principles of the invention. Numerous modifications may be made by those skilled in the art without departing from the true spirit and scope of the invention.

What is claimed is:

1. A strain measuring transducer comprising, in combination:

a beam or cantilever arm comprising a semiconductor material and having a fixed base section and a displacement section capable of being displaced by a physical force applied thereto, with the base section being a region of maximum strain of the beam or cantilever arm;

the base section being a crystal lattice heterostructure comprising in series an upper surface layer, a first aluminum gallium arsenide layer, an intermediate gallium arsenide layer, a second aluminum gallium arsenide layer and lower surface layer;

means defining a gate and means defining a semiconducting channel at the base section and beneath the surface of the crystal lattice heterostructure with the semiconducting channel comprising a portion of the intermediate gallium arsenide layer, a doping layer separate from the semiconducting channel;

first circuit means for applying an electrical potential to opposing ends of the channel to cause an electrical current to flow through the channel, means for applying a variable physical force to the displacement section of the beam or cantilever arm to subject the channel to a variable strain and to generate a piezoelectric effect, sensing means connected to opposing ends of the channel to measure changes in electrical conductance of the channel caused by said variable strain, and measuring and readout means connected to the sensing means to relate the changes in electrical conductance to the variable physical force.

2. A strain measuring transducer as set forth in claim 1 wherein the channel is formed on one face of the crystal lattice structure.

3. A strain measuring transducer as set forth in claim 1 wherein the means for applying a variable physical force comprises means for applying a deflection force to the displacement section in a direction substantially orthogonal to the face to cause a strain directed in the plane of the face at the channel.

4. A strain measuring transducer as set forth in claim 3 wherein the piezoelectric crystal lattice structure is a gallium arsenide crystal.

5. A strain measuring transducer as set forth in claim 4 wherein the beam or cantilever arm is formed from alternating layers of GaAs and AlGaAs.

6. A strain measuring transducer as set forth in claim 1 having a strain sensitivity of less than $2\times10^{-9}/\sqrt{Hz}$.

7. A strain measuring transducer as set forth in claim 1 having a power dissipation of less than 5 μW.

8. A strain measuring transducer as set forth in claim 1 having an operational bandwidth of greater than 100 kHz.

9. A strain measuring transducer as set forth in claim 1 integrated into an atomic force microscope.

10. A method of measuring the magnitude of a variable force comprising, in combination, forming a field effect semiconducting channel in a base section of a cantilever or beam having a crystal lattice heterostructure comprising in series an upper surface layer, a first aluminum gallium arsenide layer, an intermediate gallium arsenide layer, a second aluminum gallium arsenide layer and lower surface layer, with the semiconducting channel being beneath the surface of the crystal lattice heterostructure and comprising a portion of the intermediate gallium arsenide layer, and with the crystal lattice heterostructure having a doping layer separate from the semiconducting channel fixedly attaching the base section to a mounting base such that a displacement section of the lattice structure extends outwardly from an edge of said mounting base to form the beam or cantilever arm, with the channel being positioned adjacent the edge, applying the variable force to the displacement section of the structure to cause a variable magnitude of strain to be applied to the channel, and measuring variations in electrical conductance of the channel to form an indication of a magnitude of the force.

11. The method of claim 10 wherein the piezoelectric crystal structure is a gallium arsenide crystal.

12. The method of claim 11 wherein the beam or cantilever arm is formed from alternating layers of GaAs and AlGaAs.

13. A strain sensing transducer comprising, in combination, an elongated beam composed of a semiconductor crystal lattice heterostructure comprising in series an upper surface layer, a first aluminum gallium arsenide layer, an intermediate gallium arsenide layer, a second aluminum gallium arsenide layer and lower surface layer;

means defining a gate and means defining an elongated transconductive channel region beneath the surface of the crystal lattice heterostructure with the transconductive channel region comprising a portion of the intermediate gallium arsenide layer, a doping layer separate from the transconductive channel region;

said transconductive channel having a long dimension less than 100 microns and exhibiting a piezoelectric effect which varies the electrical conductance of said channel when said channel is placed under physical strain along lines of force parallel to said long dimension, means for rigidly mounting at least one end of said beam, means for applying a variable deflection force to said beam to subject said channel region to a variable magnitude of physical strain such that the conductance of said channel varies, a source of an electrical current coupled to said channel to induce a current flow therethrough, and electrical sensing means coupled to said channel for producing an electrical output signal having a value indicative of the conductance of said channel for indicating the magnitude of said deflection force.

14. A strain sensing transducer as set forth in claim 13 characterized in that the sensitivity of said transducer to said deflection force becomes greater as the size of said beam decreases.

* * * * *